United States Patent [19]
Wada et al.

[11] 3,907,584
[45]*Sept. 23, 1975

[54] GLASS COMPOSITION

[75] Inventors: Masamichi Wada; Iwao Ishida; Isamu Nakagawa, all of Otsu, Japan

[73] Assignee: Nippon Electric Glass Company, Limited, Japan

[*] Notice: The portion of the term of this patent subsequent to Mar. 27, 1990, has been disclaimed.

[22] Filed: Dec. 12, 1972

[21] Appl. No.: 314,420

[30] Foreign Application Priority Data
Dec. 20, 1971 Japan............................ 46-102574

[52] U.S. Cl.................................. 106/53; 252/478
[51] Int. Cl.²............................................ C03C 3/04
[58] Field of Search................. 106/53, 52; 252/478

[56] References Cited
UNITED STATES PATENTS

| | | | |
|---|---|---|---|
| 3,356,579 | 12/1967 | Harrington...................... | 106/53 B |
| 3,369,961 | 2/1968 | Dalton et al. ...................... | 106/53 B |
| 3,464,932 | 9/1969 | Connelly et al. ................... | 106/53 B |
| 3,619,219 | 11/1971 | Bromer et al................... | 252/478 X |
| 3,627,549 | 12/1971 | Grown et al..................... | 106/478 X |
| 3,723,354 | 3/1973 | Masamichi et al................ | 106/53 B |

Primary Examiner—Patrick P. Garvin
Assistant Examiner—John F. Niebling
Attorney, Agent, or Firm—Kurt Kelman

[57] ABSTRACT

A glass composition includes PbO falling at the range of 0.5 to 3% by weight as a component for absorbing the X-rays, and particularly, the glass composition is capable of including amount more than 1% without the discoloration due to the electron beams. $CeO_2$ is added to the glass composition to compensate PbO for the discoloration due to the irradiation of the X-rays, and the amount of $CeO_2$ is selected at the range of 0.2 to 0.6% by weight. The upper limit of $CeO_2$ is restricted by the reason why an addition more than 0.6% comes bad in the chromaticity of the panel glass. BaO, $WO_3$ and if desired SrO except PbO are added to the glass composition as the X-ray absorption components. The total amount of the X-ray, absorption components is more than 15% by weight to maintain the predetermined value of the X-ray absorption coefficient.

9 Claims, No Drawings

GLASS COMPOSITION

This invention relates to a glass composition which is suitable for a panel glass of a color television tube. In general, the glass composition of this type should be necessary to have various properties to be satisfied therein before and after forming the panel glass of the color television tube.

That is, the glass composition is molded into the panel glass for the color television tube with a high accuracy after it is molten during a heat treatment and thereafter, the panel glass formed is sealed to a funnel portion through the sealing step. Accordingly, before the molding process of the panel glass, the glass composition is required to have such properties that seeds (bubbles) will readily burst to be free from the molten material during the melting step, striae (cords) are hardly formed and it can readily be molded. Especially, it is required to perform the molding process smoothly that a temperature of liquid phase of the glass composition is less than 880°C.

Further, after the molding process of the panel glass, since it is usual for the panel glass to be heated up to about 425°–450°C during the sealing process to be sealed with the funnel portion, the glass composition should necessarily possess a strain point more than 450°C for preventing the curvature of the inner surface of the panel glass from varying by softening during the sealing process. Moreover, it is necessary that the composition should have an average coefficient of thermal expansion of $98 \times 10^{-7}$ to $102 \times 10^{-7}$ cm/cm°C within a temperature range of 30° to 380°C. Still further, in case the panel glass dissolves a good deal in the HF solution during the preparation, the glass turns opaque and adherence of a phosphor to be coated on the glass surface is diluted thereby.

Furthermore, the glass composition of this type should be required to have the excellent optical properties against various kinds of rays. That is, since on the panel glass, a clear image should be reproduced with a good contrast and a natural color on a color television, severe conditions are imposed on the panel glass with respect to the optical transmission ratio and the chromaticity. However, in general, under irradiation of X-rays, electron beams, ultraviolet rays and the like, a glass is discolored into brown or black or yellow. Therefore, the panel glass must have a property against the discoloration due to various kinds of rays. In other words, the panel glass is necessary to be discolored as little as possible. If this condition is not satisfied, it is impossible to reproduce an image of a natural color on a panel glass. Further, since X-rays occur due to bombardments of electron beams to a shadow mask, a luminescent film of a phosphor, a panel glass or the like, the panel glass should necessarily have an ability to absorb X-rays sufficiently.

Many proposals have heretofore been made with a view to providing glass compositions to satisfy the above-mentioned conditions, but no glass composition has been developed which satisfies all of these conditions. For instance, the U.S. Pat. No. 3,464,932 teaches a glass composition containing a great quantity of SrO as a glass composition which is improved at the X-ray absorbing coefficient. This glass exhibits an improved value at the ability to absorb an X-ray of 0.6 A such as 18.2–18.6 $\mu$/cm at the measured value, but it is defective on its preparation in that seeds remain in the molten material for a comparatively long time and its moldability is bad. Therefore, it is difficult to obtain a seeds free glass. Heat economy is also bad. It is known that PbO is a glass composition which is one of the good absorbers of the X-rays. However, PbO is discolored under irradiation of X-rays, and therefore, PbO is generally used in combination with $CeO_2$.

However, in a panel glass containing more than 1% of PbO, even if $CeO_2$ is added thereto, it is difficult to prevent discoloration due to electron beams when they are directly irradiated to the panel glass. Accordingly, it has been generally considered that a glass composition containing more than 1% of PbO is not suitable for a panel glass of a color television tube.

An object of this invention is to provide a glass composition for use as a panel glass which is free from discoloration due to irradiation of various kinds of rays, e.g. X-rays, electron beams, and ultraviolet rays, and which has good optical properties.

This invention is based on the concept that it is very rare that electron beams are directly irradiated to the panel glass of the color television tube. Considering an operational state of the color television tube, it is found that the panel glass of the color television tube has a luminescent film of a phosphor coated on the inner face thereof. Therefore, electron beams at first impinge against this luminescent film and thereafter reach the glass surface. Accordingly, large parts of electron are shielded by the luminescent film, and only small parts of electron beams directly reach the glass surface after passing through the film.

As a result of research we have found that the discoloration due to electron beams in the glass containing PbO is unlike the discoloration due to X-rays. The former is caused by a thin layer formed on the glass surface by reduction of PbO. In the case of the panel glass for the color television tube, since the amounts of electron beams reaching the glass surface are very small as described above, it has been found that no reduced layer is formed thereon and the glass is not substantially discolored due to electron beams, if the addition of PbO is up to 3% by weight.

In this invention, in order to increase the ability of glass to absorb X-rays, BaO, $WO_3$ and, if desired, SrO are added in addition to the above-mentioned PbO. Thus, it is possible to obtain a glass having an extremely high ability to absorb X-rays.

The glass composition of this invention comprises 58–66% of $SiO_2$, 1–4% of $Al_2O_3$, 6–15% of $K_2O$, 2–8% of $Na_2O$, 0.5–4% of CaO, 10–18% of BaO, 0.1–4% of $WO_3$, 0.5–3% of PbO and 0.1–0.6% of $CeO_2$, and according to need, up to 2% of MgO and up to 4.5% of SrO are added thereto.

As the glass composition such as mentioned above is readily melted and the liquid phase temperature of the glass composition is below 880°C (about 810° to 830°C in many cases) it can be easily molded during the forming process. Further, such glass has an average value of the coefficient of thermal expansion of $98 \times 10^{-7}$ to $102 \times 10^{-7}$ cm/cm°C within a temperature range of from 80° to 380°C and a distortion point more than 450°C, and is excellent in resistance against hydrofluoric acid. Moreover, the glass has the excellent optical properties because it has a high ability to absorb X-rays and hardly undergoes the discoloration under the irradiation of electron rays, X-rays and ultraviolet rays.

This invention will now be illustrated by reference to

Table 1 given hereinbelow.

Table 1

| Sample No. | 1 | 2 | 3 | 4 | 5 | 6 | 7 | 8 | 9 | 10 | 11 |
|---|---|---|---|---|---|---|---|---|---|---|---|
| $SiO_2$ | 60.5 | 61.0 | 62.6 | 60.7 | 62.0 | 61.7 | 63.4 | 63.1 | 62.6 | 60.1 | 62.9 |
| $Al_2O_3$ | 2.8 | 2.5 | 2.5 | 0.5 | 2.5 | 2.4 | 2.5 | 2.5 | 3.3 | 2.3 | 3.2 |
| $K_2O$ | 8.0 | 7.9 | 9.5 | 7.3 | 9.6 | 9.4 | 8.0 | 9.1 | 7.9 | 7.2 | 8.0 |
| $Na_2O$ | 7.0 | 7.5 | 6.3 | 6.9 | 6.3 | 7.3 | 7.2 | 6.2 | 6.2 | 6.5 | 7.3 |
| CaO | 2.5 | 3.3 | 1.8 | 2.5 | 2.5 | 2.2 | 2.6 | 2.2 | 1.8 | 2.5 | 2.9 |
| MgO | 1.3 | trace | trace | trace | trace | 0.3 | trace | trace | 0.6 | trace | 1.3 |
| BaO | 12.5 | 13.6 | 14.5 | 18.0 | 13.6 | 12.5 | 12.5 | 12.5 | 10.3 | 14.6 | 13.2 |
| PbO | 3.0 | 2.6 | 1.9 | 0.7 | 1.4 | 0.7 | 1.4 | 1.4 | 2.6 | 1.4 | 0.7 |
| $WO_3$ | 1.8 | 0.2 | 0.6 | 1.0 | 1.8 | 3.2 | 0.6 | 0.2 | 0.2 | 0.6 | — |
| SrO | trace | trace | trace | trace | trace | trace | 1.5 | 2.5 | 4.2 | 4.5 | 0.3 |
| $CeO_2$ | 0.6 | 0.5 | 0.3 | 0.4 | 0.3 | 0.3 | 0.3 | 0.3 | 0.3 | 0.3 | 0.2 |
| Absorption Coefficient ($\mu$/cm) | | | | | | | | | | | |
| calculated value | 25.8 | 23.7 | 23.2 | 23.3 | 23.4 | 23.0 | 22.6 | 23.6 | 26.7 | 28.1 | 19.4 |
| measured value | 21.9 | 20.1 | 19.7 | 19.8 | 19.9 | 19.5 | 19.2 | 20.0 | 22.8 | 23.8 | 17.0 |
| Degree of Brownish Coloration (%) | | | | | | | | | | | |
| X-ray | 8 | 10 | 21 | 13 | 18 | 18 | 20 | 19 | 20 | 20 | 27 |
| electron ray | 6 | 8 | 14 | 11 | 13 | 14 | 13 | 13 | 14 | 13 | 22 |
| BaO+PbO+$WO_3$+SrO | 17.3 | 16.4 | 17.0 | 19.7 | 16.8 | 16.4 | 16.0 | 16.6 | 17.8 | 21.1 | 14.2 |

As is well known, the absorption coefficient ($\mu$/cm) to an X-ray of a wavelength of 0.6 A can be calculated from the mass absorption coefficient of glass-constituting oxides and the glass density. Therefore, in the Table are shown both the calculated and measured values of the absorption coefficient.

With respect to the degree of discoloration or browning, both the value of X-ray and the value by electron beams are indicated therein. In the measurement of discoloration due to X-rays, each sample glass undergoes the irradiation of X-rays for 20 minutes from an X-ray tube lamp which is disposed 5cm apart from the sample glass and to which an electric current of 20mA is applied under 35KV. When 1 hour has passed after completion of the irradiation, the percent transmission of the glass is measured. The degree of discoloration by X-rays is expressed by the difference between the percent transmission before the irradiation and that after the irradiation.

In the case of electron rays, at first, a film of phosphor dots and the like is coated on the inner surface of a panel and a shadow mask is fixed to the panel. Then, under the same conditions as imposed on an ordinary color television tube an electron beam of 12.5 $\mu A/cm^2$ is irradiated under 30KV to the assembly for 240 hours. When 24 hours have passed after completion of the irradiation, the percent transmission of the glass is determined. The discoloration by electron beams is expressed by the difference between the percent transmission before the irradiation and that after the irradiation. The determination of the percent transmission was effected all over the visible ray range, but values measured with respect to a ray of 400m$\mu$ at which the difference in the percent transmission is maximum are shown in the Table.

By reference to the above Table, samples 1–10 are examples of the glass composition of this invention, and sample 11 is a typical instance of the commercially available glass composition for the panel glass for the color television tube. When each of samples 1–10 is compared with sample 11 with respect to the absorption coefficient, it is seen that both exhibit a tendency that the calculated value is higher than the measured value but in samples 1–10 each of the calculated values of the absorption coefficient exceeds 20 $\mu$/cm and each of the measured values exceeds 19 $\mu$/cm, while in sample 11 the calculated value is 19.4 $\mu$/cm and the measured value is 17.0 $\mu$/cm. Thus, it will be readily understood that the absorption coefficient of the commercially available glass is lower than that of the glass composition of this invention with respect to either the calculated value or the measured value. In the art it is considered desirable that the degree of discoloration by either X-rays or electron beams does not exceed 22%. Samples 1–10 all satisfies this requirement, but sample 11 is insufficient in this point.

Each of samples 3 and 5–10 contains an equal amount 0.3% of $CeO_2$, respectively, but each of them contains a different amount of PbO which is not less than 0.7%, respectively. In these samples, the degree of discoloration is almost equal and is within a range of 13 to 14%. Accordingly, even if the amount of PbO is increased within a range not exceeding 3%, it is possible to obtain a glass for a color television tube.

When sample 2 is in comparison with sample 9, and sample 4 to 6, respectively, is seen that if the PbO is equal, the higher content of $CeO_2$ results in a low degree of discoloration due to electron beams. When samples 1, 2 and 3 are compared with each other, it is seen that if the amount of $CeO_2$ is increased as the amount of PbO is increased to the composition, the discoloration due to electron beams is capable of being compensated by the addition of $CeO_2$.

In case the glass surface directly undergoes the irradiation of electron beams, the $CeO_2$ content is hardly concerned with the degree of discoloration due to various kinds of rays, and beams, but the degree of the discoloration due to electron beams tends to depend on the amount of PbO to be added to the glass composition. In the above-mentioned samples, a shadow mask is mounted inside a panel glass in advance before the irradiation of electron beams. Therefore, the inside surface of each panel glass is provided with a phosphor layer, a lacquer and an aluminum layer evaporated in vacuum before the shadow mask is mounted thereto. Thereafter, electron beams are irradiated to such an assembly under a state in practical use of the color television tube (except that the supplied voltage is raised up to 30KV and the current density per unit area is also elevated to 15 A/cm$^2$). Electron beams at first impinge against the shadow mask, the phosphor dots and the like to irradiate X-rays before bombarding to the panel glass. It is apparent that the intensity of X-rays in this measurement is higher than that of X-rays in practical use of the color television tube. However, only a small part of electron beams pass through the phosphor dots to reach the glass surface. Accordingly, while the panel glass is operated as the color television tube, the panel glass is exposed almost only to X-rays and hardly exposed to electron beams. From the foregoing, it is proved that a glass is lower in the discoloration as the amount of CeO$_2$ becomes higher.

Thus, in an actual panel glass for the color television tube on which a luminescent film of a phosphor is coated and to which a shadow mask is fixed, even if it comprises about 3% of PbO, the discoloration due to electron beams, X-rays and ultraviolet rays can be prevented by addition of a suitable amount of CeO$_2$ and thus, no disadvantages are brought about even if a color television having such panel glass is used for a long time in a usual state.

The effects of this invention will now be illustrated while referring to the glass disclosed in U.S. Pat. No. 3,404,932. As the glass proposed in said U.S. Patent, there is taken a glass having a composition, on the weight basis, of 63.0% of Al$_2$O$_3$, 3.5% of MgO, 3.5% of CaO, 10.5% of SrO, 7.0% of Na$_2$O, 10.0% of K$_2$O, 0.6% of R$_2$O$_3$ and 1.9% of F, CeO$_2$ and TiO$_2$. The glass selected shows a sufficient value of 18.2–18.6 $\mu$/cm as the panel glass in the absorption coefficient (measured value) to an X-ray of a wavelength of 0.06 A. However, as illustrated in Table 2 given below, the glass of the U.S. Patent is inferior to the glass of this invention in the property before the molding process. That is, the former takes a long time for seeds to be free from liquid of the glass composition in comparison with the latter and the temperature of the liquid phase of the former is higher than that of the latter, as shown in Table 2. Therefore, the glass of the U.S. Patent involves problems about the optical properties and the moldability.

Table 2

| Amount of F added (% by weight) | Average period till seeds-free state (hour) | |
|---|---|---|
| | Glass of this invention | Commercially available SrO glass |
| 1.2 | 7 | 10 |
| 0.8 | 9 | 12 |
| 0.2 | 12 | 15 |
| 0 | 13 | 17 |
| Liquid phase temperature (°C) | 810–880 | 860–920 |

The period till seeds-free state given in Table 2 is determined by the following method.

A compounded batch (160kg) was thrown into a crucible (having a capacity of about 180kg) maintained at 1400°C, and a glass melted was collected at every predetermined interval. Thus, the ratio of disappearance of seeds was observed, and the period till seeds-free state was determined as shown in Table 2.

Referring to Table 2, there are also shown data of glass compositions obtained by adding to the sample glasses 0.2%, 0.8% or 1.2% of F.

As is apparent from the data shown in Table 2, the glass of this invention has a lower liquid phase temperature and turns rapidly into seeds-free state and is excellent in moldability.

The glass composition of this invention will be now restricted by the following reasons.

In case the SiO$_2$ is less than 58%, the resistance against hydrofluoric acid is poor and hence, an adherence of a phosphor to the glass surface is bad. When SiO$_2$ is more than 66%, the sum of (BaO + WO$_3$ + PbO + SrO) lacks the value of 15% which is essential to hold the absorption coefficient of X-rays at the predetermined value of 18.5 $\mu$/cm by the measured value. Moreover, it is difficult to obtain a glass which is present at the range of 98 × 10$^{-7}$ 102 × 10$^{-7}$ cm/cm°C in the thermal expansion coefficient, and which is higher than 450°C at the distortion point. In case Al$_2$O$_3$ is less than 1%, the weathering resistance of glass becomes poor, and in case Al$_2$O$_3$ is greater than 4%, the viscosity of glass becomes too high, and therefore, the melting and molding temperatures are apt to be too elevated to be adapted to the panel glass. In order to maintain the coefficient of thermal expansion of the panel glass within the above-mentioned range and to obtain a desirable chromaticity, it is essential that the K$_2$O content should be present at the range of 6–15% and the Na$_2$O content should be at the range of 2–8%.

The percent transmission (the transmission ratio) and chromaticity of the panel glass for the color television tube depend on BaO, WO$_3$, PbO and SrO, and therefore, they are called the main components for shielding X-rays. But the transmission ratio and the chromaticity are influenced by the content of Fe$_2$O$_3$ incorporated as an impure substance. For these reasons, as is well-known in the art, the K$_2$O/Na$_2$O ratio is adjusted by suitably incorporating CoO and NiO.

The reason why CaO is restricted at the range of 0.5–4% is to maintain the distortion point more than 450°C. The addition more than 4% of CaO is undesirable because the distortion point becomes too high. Although it is possible to elevate the distortion point by the addition of CaO, the liquid phase temperature is too highly raised by the addition of CaO. Therefore, it is desired that MgO be added in an amount of up to about 2% to lower the liquid phase temperature to a suitable one, while considering the value of the distortion point and the liquid phase temperature of the MgO-free glass, whereby the molding of the glass composition can be facilitated.

In order to maintain the X-ray-absorbing ability at a level higher than the prescribed value, it is essential that BaO, PbO and WO$_3$ should be contained in amounts of 10–18%, 0.5–3% and 0.1–4%, respectively. More specifically, in case BaO is greater than 18%, the glass tends to devitrify easily. In case PbO exceeds 3%, the degree of brownish discoloration during the actuation of a color television tube becomes too high.

Further, in case the WO$_3$ content is higher than 4%, appearance of opaque stones, i.e., so-called tungsten smears, is likely to occur. In case a sufficient X-ray-absorbing ability cannot be obtained by the addition of only BaO, PbO and WO$_3$, a desired value of the X-ray absorbing coefficient can be obtained without degradation of characteristic properties of the glass of this invention by adding about 4.5% of SrO. In case $CeO_2$ is less than 0.1%, the effect for prevention of the discoloration is too low, and the addition more than 0.6% of $CeO_2$ results in such a bad influence to the chromaticity that a panel glass comes yellow.

As described above, the glass of this invention has such merits on the preparation steps as excellent melting characteristics and moldability. At the same time, the glass of this invention has merits on the characteristics, such as a sufficient X-ray absorption coefficient and a very low degree of discoloration due to X-rays and the like. Thus, the glass of this invention has very effective characteristic properties as a panel glass for a color television tube.

What is claimed is:

1. A glass composition consisting essentially of, by weight, 58–66% of $SiO_2$, 1–4% of $Al_2O_3$, 6–15% of $K_2O$, 2–8% of $Na_2O$, 0.5–4% of CaO, 10–18% of BaO, 0.1–4% of $WO_3$, 0.5–3% of PbO, 0.1–0.6% of $CeO_2$, up to 2% of MgO, up to 4.5% of SrO, and the sum of PbO, BaO, $WO_3$ and SrO being more than 15%.

2. A glass composition of claim 1 consisting of:

|  | Wt. percent |
|---|---|
| $SiO_2$ | 60.5 |
| $Al_2O_3$ | 2.8 |
| $K_2O$ | 8.0 |
| $Na_2O$ | 7.0 |
| CaO | 2.5 |
| MgO | 1.3 |
| BaO | 12.5 |
| PbO | 3.0 |
| $WO_3$ | 1.8 |
| SrO | trace |
| $CeO_2$ | 0.6. |

3. A glass composition of claim 1 consisting of:

|  | Wt. percent |
|---|---|
| $SiO_2$ | 61.0 |
| $Al_2O_3$ | 2.5 |
| $K_2O$ | 7.9 |
| $Na_2O$ | 7.5 |
| CaO | 3.3 |
| BaO | 13.6 |
| PbO | 2.6 |
| $WO_3$ | 0.2 |
| $CeO_2$ | 0.5. |

4. A glass composition of claim 1 consisting of:

|  | Wt. percent |
|---|---|
| $SiO_2$ | 62.6 |
| $Al_2O_3$ | 2.5 |
| $K_2O$ | 9.5 |
| $Na_2O$ | 6.3 |
| CaO | 1.8 |
| MgO | trace |
| BaO | 14.5 |
| PbO | 1.9 |
| $WO_3$ | 0.6 |
| SrO | trace |
| $CeO_2$ | 0.3. |

5. A glass composition of claim 1 consisting of:

|  | Wt. percent |
|---|---|
| $SiO_2$ | 62.0 |
| $Al_2O_3$ | 2.5 |
| $K_2O$ | 9.6 |
| $Na_2O$ | 6.3 |
| CaO | 2.5 |
| MgO | trace |
| BaO | 13.6 |
| PbO | 1.4 |

|  | Wt. percent |
|---|---|
| $WO_3$ | 1.8 |
| SrO | trace |
| $CeO_2$ | 0.3. |

6. A glass composition of claim 1 consisting of:

|  | Wt. percent |
|---|---|
| $SiO_2$ | 63.4 |
| $Al_2O_3$ | 2.5 |
| $K_2O$ | 8.0 |
| $Na_2O$ | 7.2 |
| CaO | 2.6 |
| MgO | trace |
| BaO | 12.5 |
| PbO | 1.4 |
| $WO_3$ | 0.6 |
| SrO | 1.5 |
| $CeO_2$ | 0.3. |

7. A glass composition of claim 1 consisting of:

|  | Wt. percent |
|---|---|
| $SiO_2$ | 63.1 |
| $Al_2O_3$ | 2.5 |
| $K_2O$ | 9.1 |
| $Na_2O$ | 6.2 |
| CaO | 2.2 |
| MgO | trace |
| BaO | 12.5 |
| PbO | 1.4 |
| $WO_3$ | 0.2 |
| SrO | 2.5 |
| $CeO_2$ | 0.3. |

8. A glass composition of claim 1 consisting of:

|  | Wt. percent |
|---|---|
| $SiO_2$ | 62.6 |
| $Al_2O_3$ | 3.3 |
| $K_2O$ | 7.9 |
| $Na_2O$ | 6.2 |
| CaO | 1.8 |
| MgO | 0.6 |
| BaO | 10.3 |
| PbO | 2.6 |
| $WO_3$ | 0.2 |
| SrO | 4.2 |
| $CeO_2$ | 0.3. |

9. A glass composition of claim 1 consisting of:

|  | Wt. percent |
|---|---|
| $SiO_2$ | 60.1 |
| $Al_2O_3$ | 2.3 |
| $K_2O$ | 7.2 |
| $Na_2O$ | 6.5 |
| CaO | 2.5 |
| MgO | trace |
| BaO | 14.6 |
| PbO | 1.4 |
| $WO_3$ | 0.6 |
| SrO | 4.5 |
| $CeO_2$ | 0.3. |

* * * * *